US005219438A

United States Patent [19]

Moore et al.

[11] Patent Number: 5,219,438

[45] Date of Patent: Jun. 15, 1993

[54] POST PULLER

[76] Inventors: Wayland F. Moore, Box 665; Glynard Moore, Box 586, both of Matador, Tex. 79224

[21] Appl. No.: 878,627

[22] Filed: May 5, 1992

[51] Int. Cl.[5] ............ B66C 1/48; B65G 7/12

[52] U.S. Cl. ............ 294/104; 294/16; 254/29 R

[58] Field of Search ............ 294/16, 29, 30, 31.1, 294/90, 104, 113; 254/29 R, 30, 31, 132

[56] References Cited

U.S. PATENT DOCUMENTS

| | | | |
|---|---|---|---|
| 328,983 | 10/1885 | Tompkins | 294/104 X |
| 352,724 | 11/1886 | Wells | 294/104 |
| 468,710 | 2/1892 | Mössner | 294/31.1 |
| 702,334 | 6/1902 | Schulte et al. | 294/104 |
| 749,318 | 1/1904 | Morris | 294/104 X |
| 1,410,866 | 3/1922 | Young | 81/394 |
| 1,572,286 | 2/1926 | Hanson | 294/104 |
| 1,783,830 | 12/1930 | Denmark et al. | 294/31.1 X |
| 1,848,426 | 3/1932 | Kvall | 254/131 |
| 1,932,540 | 10/1933 | Whipple | 254/29 R |
| 2,220,416 | 11/1940 | Lee | 294/31.1 |
| 2,374,406 | 4/1945 | Bezzerides | 294/16 X |
| 2,584,902 | 2/1952 | Miller | 294/104 |
| 2,634,157 | 4/1953 | Haddock | 254/30 |
| 3,119,597 | 1/1964 | Stephens | 254/29 |
| 3,680,835 | 8/1972 | Rose | 254/29 R |
| 3,724,056 | 4/1973 | Antal | 29/253 |

*Primary Examiner*—David M. Mitchell
*Assistant Examiner*—Kramer Dean J.
*Attorney, Agent, or Firm*—Konneker & Bush

[57] ABSTRACT

A post puller configured to grasp a post from the side. The post puller includes a first member having a main body portion and a generally U-shaped section extending from the main body portion and a second member pivotally secured to the first member and having a main body portion and a bent section which extends from the main body portion at an obtuse angle. The second member is movable between a first position where a forward side surface of the bent section and an inner side surface of the generally U-shaped section define an opening sized to receive the post therein and a second position where the post is frictionally engaged between the inner side surface of the generally U-shaped section and the forward side surface of the bent section.

6 Claims, 1 Drawing Sheet

POST PULLER

BACKGROUND OF THE INVENTION

1. Field of the Invention

This invention relates to a post puller and, more particularly, to a post puller configured to grasp a post from either the top or side thereof.

2. Description of Related Art

The use of posts and, in particular, metal posts, for supporting wire fencing, barb wire and the like when erecting barriers such as fences is quite common. In particular, one reason why the metal post has become quite popular is the ease in which the post may be driven into the ground. Once firmly set in the ground, however, the metal post can be quite difficult to remove. This is particularly true for those posts having relatively small diameters, e.g. on the order of ¼ to ½ inch, which are difficult to grip firmly before attempting the removal thereof.

As may be readily ascertained by its name, a post puller is a device which facilitates the removal of a post previously set in the ground. Post pullers of various designs have been disclosed in the art. For example, U.S. Pat. No. 1,848,426 to Kvall discloses a post puller having a single tubular bar with a slotted end for gripping the shank or leg portion of a T post and a strap which slides over the bar. However, the strap prevents the post puller disclosed in Kvall from grasping the bar from the side. Thus, Kvall is not usable if the bar has an obstruction attached thereto which prevents grasping the bar from the top. U.S. Pat. No. 2,374,406 to Bezzerides, on the other hand, discloses a post puller which is capable of grasping a post from the side. In Bezzerides, the post puller includes a pair of handles disposed 180 degrees with respect to each other and connected together by a back bar. Each of the handles is provided with a jaw which faces the other such that the two are configured to grip a post therebetween. The relative positioning of the handles make it difficult, if not impossible, for a single person to operate the device.

Other two handle gripping devices have also been disclosed in the art. For example U.S. Pat. No. 3,119,597 to Stephens discloses a gripping device in which each handle has an independently pivotable flat surfaced jaw for gripping a pipe or rod therebetween. Gripping devices having bevelled gripping surfaces have also been disclosed in the art. See, for example, U.S. Pat. Nos. 1,410,866 to Young and 1,932,540 to Whipple. Finally, U.S. Pat. No. 3,680,835 to Rose discloses the use of a curved gripping face shaped to receive a rod.

SUMMARY OF THE INVENTION

In one embodiment, the present invention is of a post puller configured to grasp a post from either the top or the side. The post puller includes a first member having a main body portion and a generally U-shaped section extending from the main body portion and a second member pivotally secured to the first member and having a main body portion and a bent section which extends from the main body portion at an obtuse angle. The second member is movable between a first position where a forward side surface of the bent section and an inner side surface of the generally U-shaped section define an opening sized to receive the post therein and a second position where the post is frictionally engaged between the inner side surface of the generally U-shaped section and the forward side surface of the bent section. In one aspect, the forward side surface of the bent section includes a straight section and a curved section such that, in the first position, the straight section faces the inner side surface of the generally U-shaped section and, in the second position, the curved section frictionally engages the post. In another aspect of this embodiment of the invention, the curved section of the forward side surface may also have a groove formed therein such that the groove frictionally engages the post when the second member is in the second position.

In a second embodiment, the present invention is of a gripping device which includes a first shaft, first and second projecting members extending outwardly from a first end of the first shaft in a spaced relationship with each other, a second shaft, and a gripping member outwardly projecting from a first end of the second shaft and pivotally secured to the second projecting member. The second projecting member includes a generally U-shaped positioning section for receiving an article to be gripped thereby. When the gripping member is in a first position, the U-shaped positioning section engages the article and, in the second position, the gripping member grasps the article. In one aspect of this embodiment of the invention, the gripping member includes a first section having a generally flat forward side surface which is generally parallel with an end surface of the first projecting member when the gripping member is in the first position and may also project from the second shaft at an obtuse angle. The gripping member may further include a second section having a curved forward side surface which engages the article when the gripping member is in the second position. In another aspect of this embodiment of the invention, the gripping member may be received between and pivotally secured to the first and second projecting members.

BRIEF DESCRIPTION OF THE DRAWINGS

The invention may be better understood, and its numerous objects, advantages and features will become apparent to those skilled in the art by reference to the following drawings in which.

DETAILED DESCRIPTION OF A PREFERRED EMBODIMENT

Figure 1:
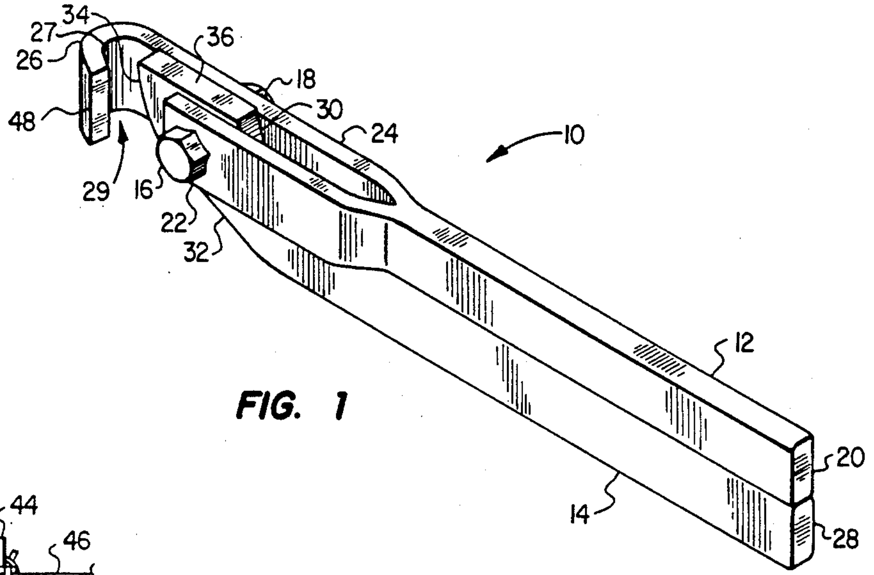
FIG. 1 is a perspective view of a side mountable post puller constructed in accordance with the teachings of the present invention.

Referring first to FIG. 1, a post puller 10 configured to engage a post from either the top or the side and constructed in accordance with the teachings of the present invention will now be described in greater detail. The post puller 10 is comprised of a first handle 12 pivotally secured to a second handle 14 by securement means 16. For example, securement means 16 may be a metal bolt 16 having a shaft (not shown) which passes through apertures (also not shown) in the first and second handles 12, 14 and secured at its end by a nut 18.

The first handle 12 includes a shaft 20 and first and second split sections 22 and 24 integrally formed with the shaft 20 and extending outwardly therefrom in a generally parallel spaced relationship with each other. The first split section 22 includes an end face 23 and the second split section 24 includes a generally U-shaped end section 26 having an end face 48 which faces the end face 23 of the first split section 22. The second handle 14 includes a shaft 28 which, in the closed position illustrated in FIG. 1, extends generally parallel to the shaft 20. At one end thereof, the shaft 28 is bent at a generally obtuse angle, for example, 135 degrees, to form a bent section 30 having a first, generally flattened, forward side surface section 32 and a second, curved, forward side surface section 34. As the bent section 30 of the shaft 28 curves upwardly and passes between the first and second split sections 22, 24, the bent section 30 gradually widens until it terminates at end surface 36.

Figure 2:
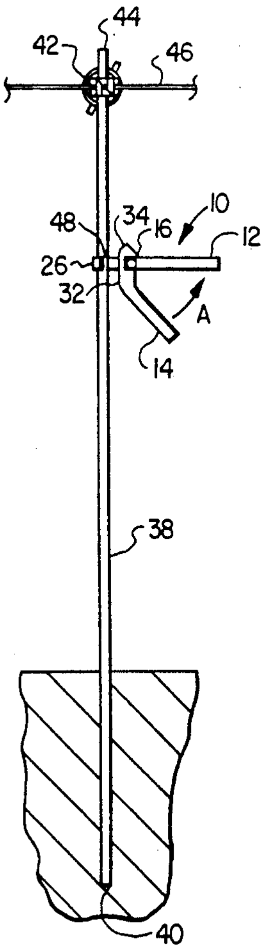
FIG. 2 illustrates the post puller of FIG. 1 in the open position and positioned to grasp a post of an electric fence from one side thereof.

Referring next to FIG. 2, the operation of the post puller 10 may now be described in greater detail and the advantages of the invention, particularly in grasping, during a removal process, the posts of electric fences and other rod-like structures which cannot be grasped from the top side thereof due to the presence of obstructions mounted thereto, will become apparent to those skilled in the art. In FIG. 2, a post 38 has its lower end 40 firmly set in the ground. A typical post 38 would be formed of metal, have a diameter of about ⅜ inch and be about four feet long. To firmly set the post 38 described herein, the lower end 40 should be driven into the ground a distance between 8 and 12 inches. Mounted approximately 4 to 5 inches from a top end 44 of the post is an insulator 42 constructed of plastic, porcelain or other non-conductive material. For example, the insulator 42 may include an aperture formed therein which permits the insulator 42 to slide onto the post 38 and a lock nut which may be tightened to fixedly secure the insulator 42 to the post 38. The insulator 42 may also includes a small clip or other hook-like structure to supportably mount a wire 46 thereon. By stringing the wire between the post 38 and adjacent posts (not shown) space several feet apart, an electric fence or other barrier structure is constructed.

As may be seen in FIG. 2, the presence of both the insulator 42 mounted near the top end 44 of the post 38 and the wire 46 supportably mounted on and horizontally extending away from the insulator 42 prevents, during the extraction of the post 38 from the ground, the use of a post puller which would be slid over the top end 44 of the post 38 and then tightened to grab the post 38. Accordingly, in accordance with the present invention, the post puller 10 is configured so that it may be slid onto the post 38 from the side, thereby avoiding interference with the insulator 42 or the wire 46. To grasp the post 38 from the side, the handles 12, 14 of the post puller 10 are moved into a first, open, position as illustrated in FIG. 2. More specifically, the first handle 12 is held at a generally orthogonal angle to the post 38 and the second handle 14 is moved downwardly until the generally flattened forward side surface section 32 of the bent section 30 is generally parallel with and spaced apart from the end face 48 of the U-shaped end section 26 of the first handle 12. By positioning the second handle 14 in this manner, an opening sufficiently large to receive the post 38 is formed between the flattened forward side surface section 32 of the bent section 30 and the end face 48 of the U-shaped section 26. The post puller 10 is then moved towards the post 38 from one side thereof until the post 38 is inserted between the end face 48 of the U-shaped end section 26 and the end face 23 of the second split section 22 and positioned in an opening 29 defined by the flattened forward side surface 32 of the bent section 30 and an inner surface 27 of the U-shaped end section 26. The handles 12, 14 of the post puller 10 are then adjusted so that the post 38 is frictionally engaged by the inner surface 27 of the generally U-shaped end section 26. By sizing the inner surface 27 of the U-shaped end section 26 to be just slightly larger than the circumference of the post 38, the inner surface 27 will frictionally engage the post 38 along approximately half of its circumference.

Figure 3:
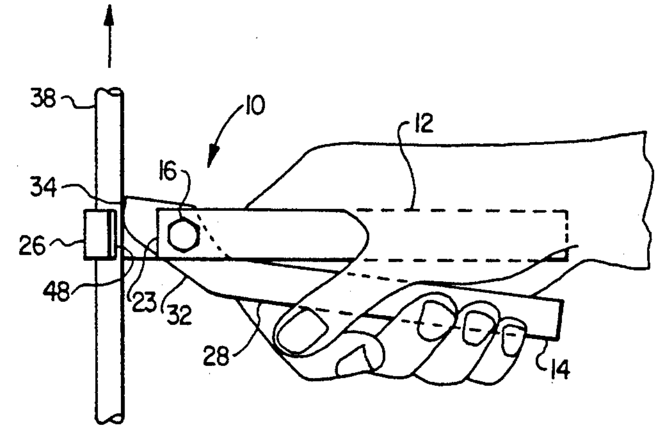
FIG. 3 is a side view of the post puller of FIGS. 1 and 2 in the closed position in which the post is firmly grasped.

After frictionally engaging the post 38, the second handle 14 is then pulled in direction "A" towards the first handle 12 until the post puller 10 is in a second, or closed, position, as illustrated in FIG. 3. As the second handle 14 moves in direction "A", the curved forward side surface 34 of the bent section 30 begins to approach the post 38. Furthermore, as the first and second handles 12 and 14 approach each other, the separation between the end face 48 and the forward side surfaces 32, 34 of the bent section 30 is decreased, thereby securing the post 38 within the opening 29. As the handle 14 continues to approach the handle 12, the curved forward side surface 34 engages the post 38, thereby firmly grasping the post 38 between the curved forward side surface 34 and the inner surface 27. The post 38 may then be removed from the ground by first twisting the post pullers 10 to loosen the post 38 and then pulling upwardly on the post pullers 10 to remove the post 38 from the ground.

Figure 4:
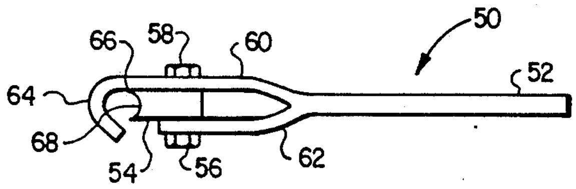
FIG. 4 is a top view of an alternate embodiment of the post puller of FIGS. 1-3.

Referring next to FIG. 4, a second embodiment of the invention shall now be described in greater detail. Here, a post puller 50 includes a first handle 52 having a first split section 60 which includes a U-shaped end section 64 and a second split section 62, a second handle 54 and securement means which includes a metal bolt 56 having a shaft (not shown) which passes through apertures (also not shown) in the first split section 60, the second handle 54 and the second split section 62 and is secured by a nut 58. The post puller 50 is identical to the post puller 10 previously described except that, unlike the post puller 10, the second handle 54 of the post puller 50 has a curved forward side surface 66 having a groove 68 formed therein. Preferably, the groove 68 is sized to correspond to the diameter of the post 38. Thus, when the second handle 54 of the post puller 50 is closed to grasp the post 38, the curved forward side surface 66 will grasp the post 38 to a greater circumferential extent, thereby improving the grip of the post puller 50 on the post 38.

Thus, there has been described and claimed herein, a post puller configured for grasping a post from both the side, thereby permitting the puller to grasp posts having structural elements which prevents grasping the post from the top end thereof. However, those skilled in the art will recognize that numerous modifications and variations from that specifically disclosed herein are possible without substantially departing from the scope of the present invention. It should be clearly understood, therefore, that the embodiment of the invention disclosed herein is considered to be exemplary only and should not be construed as limiting the invention, which is defined only by the appended claims.

What is claimed is:

1. A side mountable post puller for grasping a post from a side thereof, comprising:

a first member having a first elongated main body portion, a first projecting portion extending from said first main body portion and terminating in a first end surface, a second projecting portion extending from said first main body portion and having a first section in a generally parallel spaced relationship with said first projecting portion and a generally U-shaped section extending from said first section, said U-shaped section having a curved inner side surface and terminating in a second end surface;

a second member having a second elongated main body portion and a bent portion extending from said second main body portion and between said first and second projecting portions of said first member, said bent portion having lower, upper and top side surfaces, said upper side surface extending from said second main body portion at a first obtuse angle and said lower side surface having a first, generally straight, segment extending from said second main body portion and a second, generally curved, segment, said first segment of said lower side surface extending from said second main body portion at a second obtuse angle such that separation between said lower and upper side surfaces increases between said second main body portion and said second segment of said bent portion; and means for pivotally securing said bent portion of said second member to said first and second projecting portions of said first member, said second member movable between first and second positions;

wherein, in said first position, said first segment of said lower side surface of said bent portion and said end surface of said generally U-shaped section define an opening sized to permit passage of said post therebetween and, in said second position, a first portion of a first side surface of said post is frictionally engaged by said inner side surface of said generally U-shaped section and said second segment of said lower side surface of said bent portion.

2. A post puller according to claim 1 wherein said top side surface is generally parallel with said second main body portion.

3. A post puller according to claim 2 wherein said second segment of said bent portion of said second member further comprises a groove formed therein for receivingly engaging a second portion of said side surface of said post.

4. A side mountable post puller for grasping a post having a specified circumference from a side thereof, comprising:

a first member having a first elongated main body portion, a first projecting portion extending from said first main body portion and terminating in a first, generally planar, end surface, a second projecting portion extending from said first main body portion and having a first section in a generally parallel spaced relationship with said first projecting portion and a generally U-shaped section extending from said first section, said U-shaped section having a curved inner side surface which defines a post receiving area and which is sized to frictionally engage said post having said specified circumference along approximately half of said circumference, said U-shaped section terminating in a second, generally planar, end surface, said first and second end surfaces in a non-parallel spaced relationship with each other in which separation between said first and second end surfaces increases with distance from said post receiving area;

a second member having a second elongated main body portion and a bent portion extending from said second main body portion and between said first and second projecting portions of said first member, said bent portion having lower, upper and top side surfaces, said upper side surface extending from said second main body portion at a first obtuse angle and said lower side surface having a first, generally straight, segment extending from said second main body portion and a second, generally curved, segment, said first segment of said lower side surface extending from said second main body portion at a second obtuse angle such that separation between said lower and upper side surfaces increases between said second main body portion and said second segment of said bent portion; and means for pivotally securing said bent portion of said second member to said first and second projecting portions of said first member, said second member movable between first and second positions;

wherein, in said first position, said first segment of said lower side surface of said bent portion and said end surface of said generally U-shaped section define an opening sized to permit passage of said post therebetween and into said post receiving area where a first portion of said post encompassing approximately half of said circumference of said post frictionally engages said curved inner side of said U-shaped section and where a second portion of said post projects outwardly from said post receiving area and, in said second position, said second portion of said post is frictionally engaged by said second segment of said lower side surface of said bent portion of said second member.

5. A post puller according to claim 4 wherein said top side surface is generally parallel with said second main body portion.

6. A post puller according to claim 5 wherein said second segment of said bent portion of said second member further comprises a groove formed therein for receivingly engaging part of said second portion of said post.

* * * * *